United States Patent [19]
Pennise

[11] Patent Number: 5,801,804
[45] Date of Patent: Sep. 1, 1998

[54] LINEARLY ADJUSTABLE SUNGLASSES

[76] Inventor: Robert Pennise, 7580 Ferry Rd. Box 413, Point Pleasant, Pa. 18950

[21] Appl. No.: 842,764

[22] Filed: Apr. 17, 1997

[51] Int. Cl.$^6$ .................. G02C 7/10; G02C 5/04
[52] U.S. Cl. .................. 351/44; 351/47; 351/128
[58] Field of Search .................. 351/44, 47, 51, 351/128

[56] References Cited

U.S. PATENT DOCUMENTS

| | | | |
|---|---|---|---|
| 2,687,524 | 8/1954 | Mosher | 351/47 |
| 2,901,752 | 9/1959 | Granger | 351/47 |
| 5,477,281 | 12/1995 | Boyer | 351/128 |

FOREIGN PATENT DOCUMENTS

| | | | |
|---|---|---|---|
| 765732 | 6/1934 | France | 351/47 |

*Primary Examiner*—Huy Mai

[57] ABSTRACT

Linearly adjustable sunglasses for allowing a wearer of a pair of eyeglasses to removably mount sunglasses lenses on the pair of eyeglasses. The inventive device includes a first-half frame member and a second-half frame member linearly adjustably coupled to the first-half frame member. A first lens and a second lens are secured to the first-half frame member and the second-half frame member, respectively. The first-half frame member and the second-half frame member are linearly adjustable between an expanded position and a contracted position. As such, the first lens and the second lens are positionable in use between the temple pieces of a pair of eyeglasses rearward the lenses of the pair of eyeglasses.

14 Claims, 2 Drawing Sheets

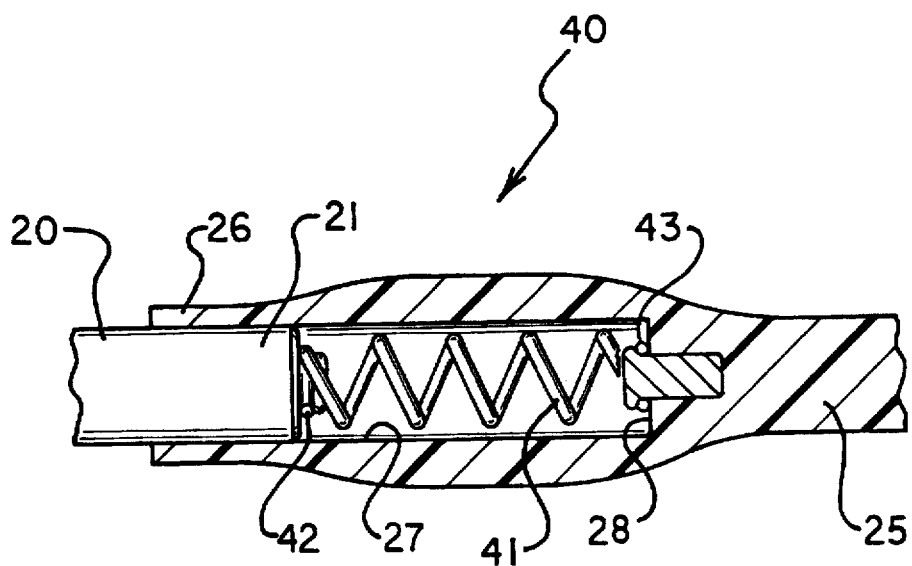
FIG. 3
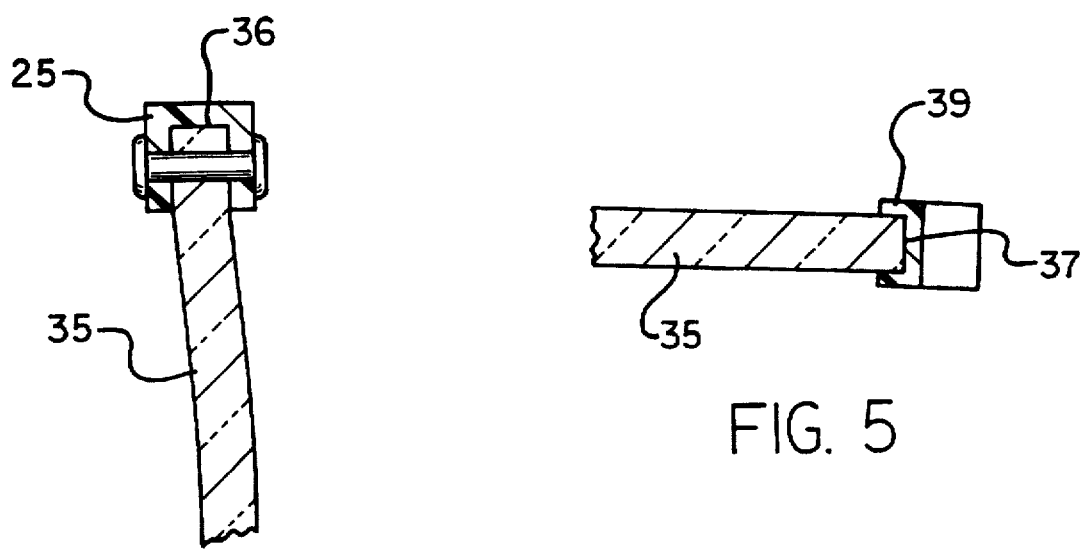
FIG 4
FIG. 5

5,801,804

1

LINEARLY ADJUSTABLE SUNGLASSES

BACKGROUND OF THE INVENTION

1. Field of the Invention

The present invention relates to eyewear accessories and more particularly pertains to new linearly adjustable sunglasses for allowing a wearer of a pair of eyeglasses to removably mount sunglasses lenses on the pair of eyeglasses.

2. Description of the Prior Art

The use of eyewear accessories is known in the prior art. More specifically, eyewear accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art eyewear accessories include U.S. Pat. No. 4,247,178; U.S. Pat. No. 4,659,196; U.S. Pat. No. D267,724; U.S. Pat. No. 5,164,749; U.S. Pat. No. 5,007,727; and U.S. Pat. No. 5,056,906.

While these devices fulfill their respective, particular objectives and requirements, the aforementioned patents do not disclose new linearly adjustable sunglasses. The inventive device includes a first-half frame member and a second-half frame member linearly adjustably coupled to the first-half frame member. A first lens and a second lens are secured to the first-half frame member and the second-half frame member, respectively. The first-half frame member and the second-half frame member are linearly adjustable between an expanded position and a contracted position. As such, the first lens and the second lens are positionable in use between the temple pieces of a pair of eyeglasses rearward the lenses of the pair of eyeglasses.

In these respects, the linearly adjustable sunglasses according to the present invention substantially departs from the conventional concepts and designs of the prior art, and in so doing provides an apparatus primarily developed for the purpose of allowing a wearer of a pair of eyeglasses to removably mount sunglasses lenses on the pair of eyeglasses.

SUMMARY OF THE INVENTION

In view of the foregoing disadvantages inherent in the known types of eyewear accessories now present in the prior art, the present invention provides new linearly adjustable sunglasses construction wherein the same can be utilized for allowing a wearer of a pair of eyeglasses to removably mount sunglasses lenses on the pair of eyeglasses.

The general purpose of the present invention, which will be described subsequently in greater detail, is to provide a new linearly adjustable sunglasses apparatus and method which has many of the advantages of the eyewear accessories mentioned heretofore and many novel features that result in new linearly adjustable sunglasses which are not anticipated, rendered obvious, suggested, or even implied by any of the prior art eyewear accessories, either alone or in any combination thereof.

To attain this, the present invention generally comprises a first-half frame member and a second-half frame member linearly adjustably coupled to the first-half frame member. A first lens and a second lens are secured to the first-half frame member and the second-half frame member, respectively. The first-half frame member and the second-half frame member are linearly adjustable between an expanded position and a contracted position. As such, the first lens and the second lens are positionable in use between the temple pieces of a pair of eyeglasses rearward the lenses of the pair of eyeglasses.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new linearly adjustable sunglasses apparatus and method which has many of the advantages of the eyewear accessories mentioned heretofore and many novel features that result in new linearly adjustable sunglasses which are not anticipated, rendered obvious, suggested, or even implied by any of the prior art eyewear accessories, either alone or in any combination thereof.

It is another object of the present invention to provide new linearly adjustable sunglasses which may be easily and efficiently manufactured and marketed.

It is a further object of the present invention to provide new linearly adjustable sunglasses which are of a durable and reliable construction.

An even further object of the present invention is to provide new linearly adjustable sunglasses which are susceptible of a low cost of manufacture with regard to both materials and labor, and which accordingly is then susceptible of low prices of sale to the consuming public, thereby making such Snap-In Sunglass Lenses economically available to the buying public.

Still yet another object of the present invention is to provide new linearly adjustable sunglasses which provide in the apparatuses and methods of the prior art some of the advantages thereof, while simultaneously overcoming some of the disadvantages normally associated therewith.

Still another object of the present invention is to provide new linearly adjustable sunglasses for allowing a wearer of a pair of eyeglasses to removably mount sunglasses lenses on the pair of eyeglasses.

Yet another object of the present invention is to provide new Snap-In Sunglass Lenses which include a first-half frame member and a second-half frame member linearly adjustably coupled to the first-half frame member. A first lens and a second lens are secured to the first-half frame member and the second-half frame member, respectively. The first-half frame member and the second-half frame member are linearly adjustable between an expanded position and a contracted position. As such, the first lens and the second lens are positionable in use between the temple pieces of a pair of eyeglasses rearward the lenses of the pair of eyeglasses.

Still yet another object of the present invention is to provide new linearly adjustable sunglasses that could easily transform a pair of prescription eyeglasses into sunglasses whereby the sunglass lenses would be easy to install on and remove from the pair of prescription eyeglasses.

Even still another object of the present invention is to provide new linear adjustable sunglasses that would be positioned between lenses of a pair of prescription eyeglasses and the wearer. Thus, the sunglass lenses would not be readily visible and would not be an eyesore detracting from the wearer's appearance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3—3 of FIG. 2.

FIG. 4 is a cross sectional view taken along line 4—4 of FIG. 2.

FIG. 5 is a cross sectional view taken along line 5—5 of FIG. 2.

DESCRIPTION OF THE PREFERRED EMBODIMENT

Figure 1:
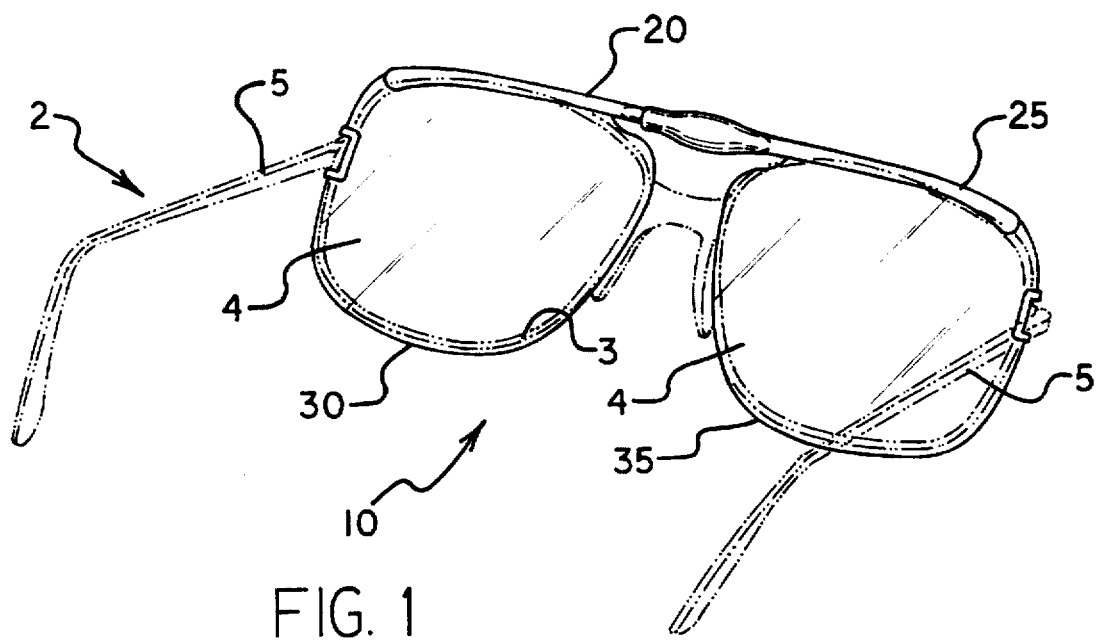
FIG. 1 is an illustration of new linearly adjustable sunglasses mounted in a pair of eyeglasses according to the present invention.

With reference now to the drawings, and in particular to FIGS. 1 through 5 thereof, new linearly adjustable sunglasses embodying the principles and concepts of the present invention and generally designated by the reference numeral 10 will be described.

More specifically, it will be noted that the linearly adjustable sunglasses 10 comprise a first-half frame member 20 and a second-half frame member 25 linearly adjustably coupled to the first-half frame member 20. A first lens 30 and a second lens 35 are secured to the first-half frame member 20 and the second-half frame member 25, respectively. The first-half frame member 20 and the second-half frame member 25 are linearly adjustable between an expanded position and a contracted position. As such, the first lens 30 and the second lens 35 are positionable in use between the temple pieces 5 of a pair of eyeglasses 2 rearward the lenses 4 of the pair of eyeglasses 2.

The linearly adjustable sunglasses 10 are intended for use with a pair of eyeglasses 2 including a frame 3, a pair of lenses 4 mounted to the frame 3, and a pair of temple pieces 5 extending from opposite sides of the frame 3. Furthermore, in an illustrative embodiment, the first lens 30 and the second lens 35 are tinted sunglass lenses. As such, a wearer of prescription eyeglasses may convert his or her prescription eyeglasses to sunglasses with the present invention.

As best illustrated in FIG. 3, it can be shown that the first-half frame member 20 and the second-half frame member 25 each have an inner end 21 and 26, respectively. The inner end 26 of the second-half frame member 25 has a cavity 27 therein. Accordingly, the cavity 27 of the second-half frame member 25 has a bottom 28. The inner end 21 of the first-half frame member 20 slidably fits within the cavity 27 of the second-half frame member 25. As such, the first-half frame member 20 and the second-half frame member 25 are linearly adjustable toward and away from each other wherein the inner end 21 of the first-half frame member 20 slides within the cavity 27 of the second-half frame member 25.

Figure 2:
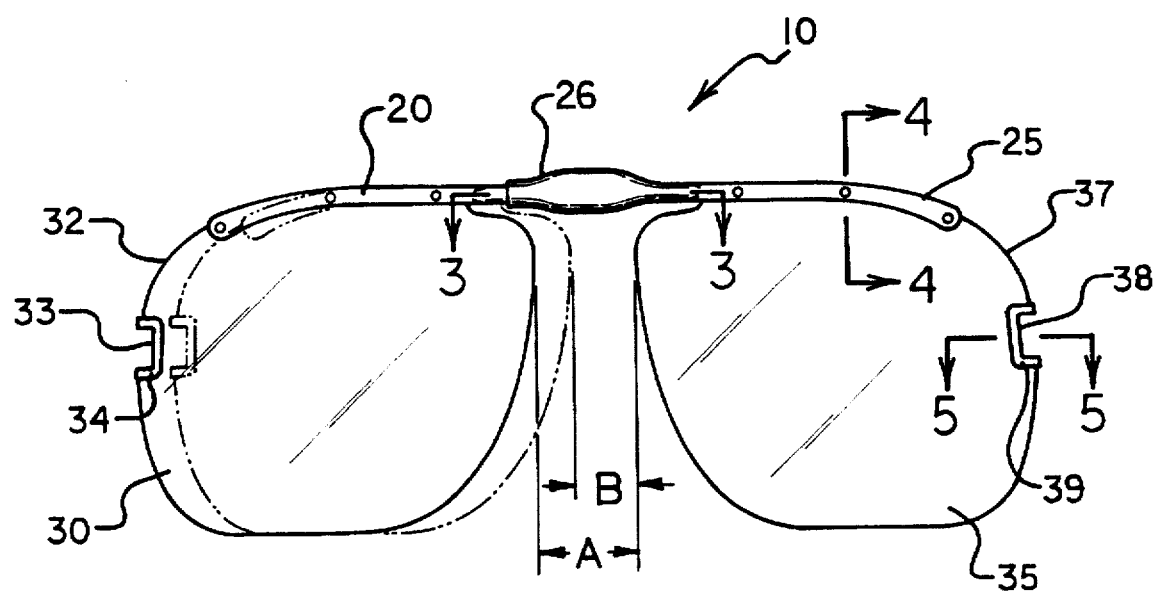
FIG. 2 is an illustration of the present invention.

As best illustrated in FIG. 2, it can be shown that the first lens 30 and the second lens 35 each have a top edge 31 and 36, respectively, and an outer side edge 32 and 37, respectively. The first lens 30 is secured to the first-half frame member 20 along the top edge 31 thereof and the second lens 35 is secured to the second-half frame member 25 along the top edge 36 thereof. The outer side edge 32 of the first lens 30 and the outer side edge 37 of the second lens 35 each have a notch 33 and 38, respectively, therein. Each notch 33 and 38 is adapted for receiving and partially surrounding one of the temple pieces 5 of the eyeglasses 2. Accordingly, the outer side edge 32 of the first lens 30 and the outer side edge 37 of the second lens 35 each abut one of the temple pieces 5 of the eyeglasses 2.

Each notch 33 and 38 is shaped for conforming to the shape of the temple pieces 5 of the eyeglasses 2. In an illustrative embodiment, each notch 33 and 38 is semi-rectangular in shape and has a top, a bottom, and a side. Consequently, the side of the notch abuts an inner surface of the temple piece and the top and the bottom of the notch are adjacent the top and the bottom of the temple piece. Optionally, a notch reinforcement member 34 and 39 is provided within the perimeter of each notch 33 and 38, respectively, wherein the notch reinforcement member 34 and 39 abuts the temple piece 5 of the eyeglasses 2.

A linear adjustment means 40 is provided for linearly adjusting the distance between the first-half frame member 20 and the second-half frame member 25. The linear adjustment means 40 comprises a spring 41 disposed within the cavity 27 provided in the inner end 26 of the second-half frame member 25. The spring 41 has a first end 42 secured to the inner end 21 of the first-half frame member 20 and has a second end 43 secured to the bottom 28 of the cavity 27 provided in the inner end 26 of the second-half frame member 25.

As best illustrated in FIG. 2, it can be shown that the first-half frame member 20 and the second-half frame member 25 are linearly adjustable between an expanded position, wherein the first lens 30 and the second lens 35 are separated by a first distance A, and a contracted position, wherein the first lens 30 and the second lens 35 are separated by a second distance B. Consequently, the second distance B is less than the first distance A. Furthermore, the first-half frame member 20 and the second-half frame member 25 are biased to the expanded position by the spring 41.

In use, the first-half frame member 20 and the second-half frame member 25 are linearly compressed toward each other to the contracted position wherein the first lens 30 and the second lens 35 are resultantly linearly compressed toward each other. As such, the first lens 30 and the second lens 35 are positioned between the temple pieces 5 of the pair of eyeglasses 2 so as to be positioned directly behind the lenses 4 of the pair of eyeglasses 2. Thereafter, the first-half frame member 20 and the second-half frame member 25 are allowed to expand toward the expanded position whereby the outer side edge 32 of the first lens 30 and the outer side edge 37 of the second lens 35 each abut one of the temple pieces 5 of the eyeglasses 2. More specifically, the side of the notch abuts an inner surface of the temple piece and the top and the bottom of the notch are adjacent the top and the bottom of the temple piece. As such, the linearly adjustable sunglasses 10 are removably mounted on the pair of eyeglasses 2.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sunglass lenses assembly for use with a pair of eyeglasses including a frame, a pair of lenses mounted to said frame, and a pair of temple pieces extending from opposite sides of said frame, said sunglass lenses assembly comprising:

a first-half frame member;

a second-half frame member linearly adjustably coupled to said first-half frame member;

a first lens secured to said first-half frame member;

a second lens secured to said second-half frame member;

said first lens and said second lens positioned between said pair of temple pieces of said pair of eyeglasses rearward said pair of lenses of said pair of eyeglasses;

said first lens and said second lens each have a top edge and an outer side edge;

said first lens secured to said first-half frame member along said top edge of said first lens;

said second lens secured to said second-half frame member along said top edge of said second lens; and said outer side edge of said first lens abutting a first of said pair of temple pieces and said outer side edge of said second lens abutting a second of said pair of temple pieces.

2. The sunglass lenses assembly of claim 1, wherein said outer side edge of said first lens and said outer side edge of said second lens each have a notch therein.

3. The sunglass lenses assembly of claim 2, wherein said notch is adapted for receiving and partially surrounding one of said pair of temple pieces of said pair of eyeglasses.

4. The sunglass lenses assembly of claim 1, wherein said first-half frame member and said second-half frame member each have an inner end, said inner end of said second-half frame member having a cavity therein, said cavity having a bottom, said inner end of said first-half frame member slidably fitted within said cavity of said second-half frame member.

5. The sunglass lenses assembly of claim 1, wherein said first-half frame member and said second-half frame member are linearly adjustable between an expanded position and a contracted position, said first lens and said second lens separated by a first distance in said expanded position, said first lens and said second lens separated by a second distance in said contracted position, said second distance less than said first distance.

6. The sunglass lenses assembly of claim 5, wherein said first-half frame member and said second-half frame member are biased to said expanded position.

7. The sunglass lenses assembly of claim 1, further comprising:

a linear adjustment means for linearly adjusting a distance between said first-half frame member and said second-half frame member.

8. The sunglass lenses assembly of claim 7, wherein said linear adjustment means comprises:

a spring disposed within said cavity provided in said inner end of said second-half frame member, said spring having a first end and a second end, said first end secured to said inner end of said first-half frame member and second end secured to said bottom of said cavity provided in said inner end of said second-half frame member.

9. A sunglass lenses assembly for use with a pair of eyeglasses including a frame, a pair of lenses mounted to said frame, and a pair of temple pieces extending from opposite sides of said frame, said sunglass lenses assembly comprising:

a fixed frame member;

an adjustable frame member coupled to said fixed frame member;

a first lens secured to said adjustable frame member;

a second lens secured to said fixed frame member;

said first lens and said second lens being removably positioned between said pair of temple pieces of said pair of eyeglasses rearward said pair of lenses of said pair of eyeglasses;

said first lens and said second lens each have an outer side edge;

said outer side edge of said first lens abutting a first of said pair of temple pieces; and said outer side edge of said second lens abutting a second of said pair of temple pieces.

10. The sunglass lenses assembly of claim 9, wherein each said outer side edge has a notch therein.

11. The sunglass lenses assembly of claim 10, wherein said notch is adapted for partially surrounding one of said pair of temple pieces of said pair of eyeglasses.

12. The sunglass lenses assembly of claim 9, wherein said fixed frame member and said adjustable frame member each have an inner end, said inner end of said fixed frame member having a cavity therein, said inner end of said adjustable frame member slidably fitted within said cavity of said fixed frame member.

13. The sunglass lenses assembly of claim 12, further comprising:

a linear compression and expansion means for linearly compressing and expanding said fixed frame member and said adjustable frame member toward and away from each other.

14. The sunglass lenses assembly of claim 13, wherein said linear compression and expansion means comprises:

a spring disposed within said cavity provided in said inner end of said fixed frame member, said spring having a first end and a second end, said first end secured to said inner end of said adjustable frame member and second end secured within said cavity provided in said inner end of said fixed frame member.

* * * * *